(12) United States Patent
Marupaduga et al.

(10) Patent No.: US 8,897,383 B1
(45) Date of Patent: Nov. 25, 2014

(54) ENHANCED MULTIPATH ENVIRONMENTS FOR MIMO WIRELESS NETWORKS

(71) Applicant: Sprint Communications Company L.P., Overland Park, KS (US)

(72) Inventors: Sreekar Marupaduga, Overland Park, KS (US); Nicholas David Kullman, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/924,753

(22) Filed: Jun. 24, 2013

(51) Int. Cl.
  *H04B 7/02* (2006.01)
  *H04L 1/02* (2006.01)
  *H04W 24/02* (2009.01)

(52) U.S. Cl.
  CPC .................................. *H04W 24/02* (2013.01)
  USPC ........................... 375/267; 375/259; 375/260

(58) Field of Classification Search
  CPC .................................................... H04W 24/02
  See application file for complete search history.

(56) References Cited

U.S. PATENT DOCUMENTS

| | | | | |
|---|---|---|---|---|
| 8,111,709 | B2* | 2/2012 | Hunukumbure et al. | 370/437 |
| 8,200,244 | B2 | 6/2012 | Levin et al. | |
| 2012/0207238 | A1* | 8/2012 | Tan et al. | 375/267 |
| 2014/0161018 | A1* | 6/2014 | Chang et al. | 370/312 |

* cited by examiner

*Primary Examiner* — Erin File

(57) ABSTRACT

A wireless communication device to improve multipath environments for multiple-input multiple-output (MIMO) wireless networks comprises a wireless communication transceiver and a processing system. The wireless communication transceiver is configured to receive MIMO performance information for a plurality of locations of a premises. The processing system is configured to process the MIMO performance information to determine individual ranks associated with each of the locations, wherein higher ones of the ranks indicate better MIMO performance, compare each of the individual ranks to a threshold to determine a group of suboptimal locations of the plurality of locations that have ranks falling below the threshold, and process the suboptimal locations with an in-building geometry of the premises to identify at least one location to install a scattering agent.

20 Claims, 5 Drawing Sheets

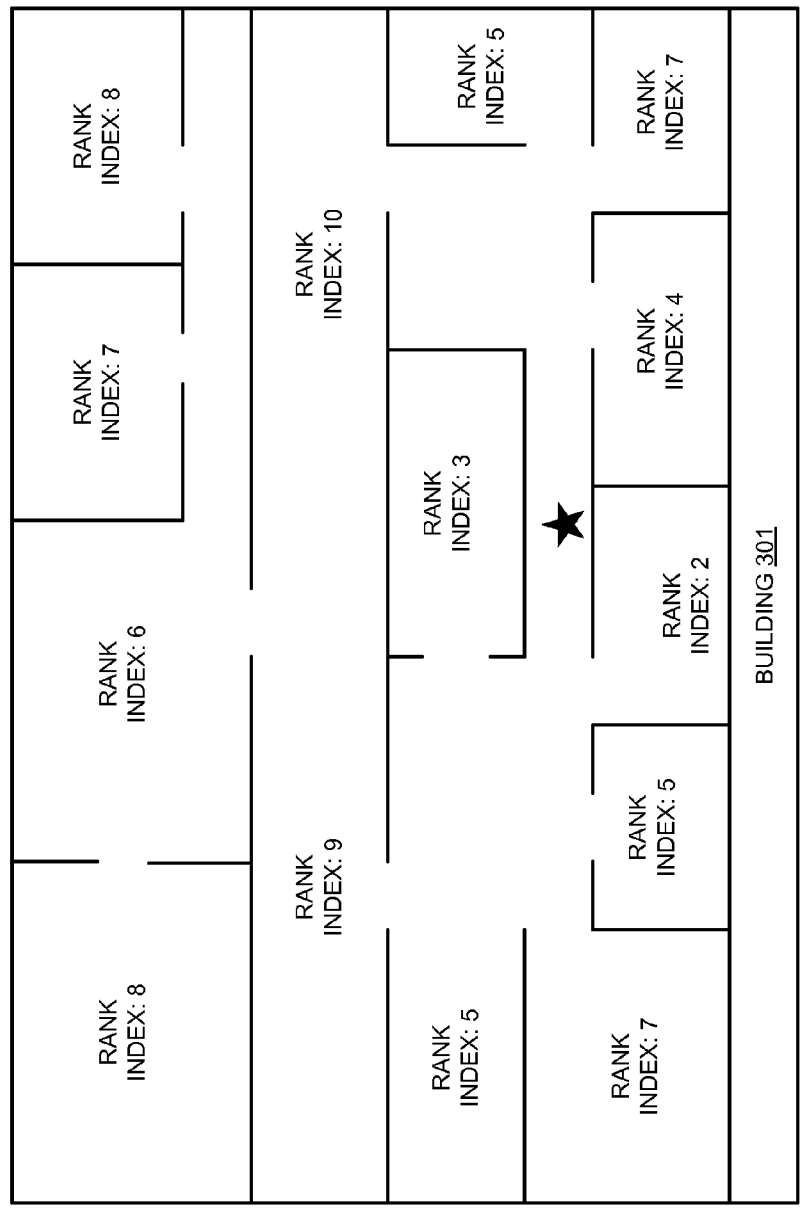

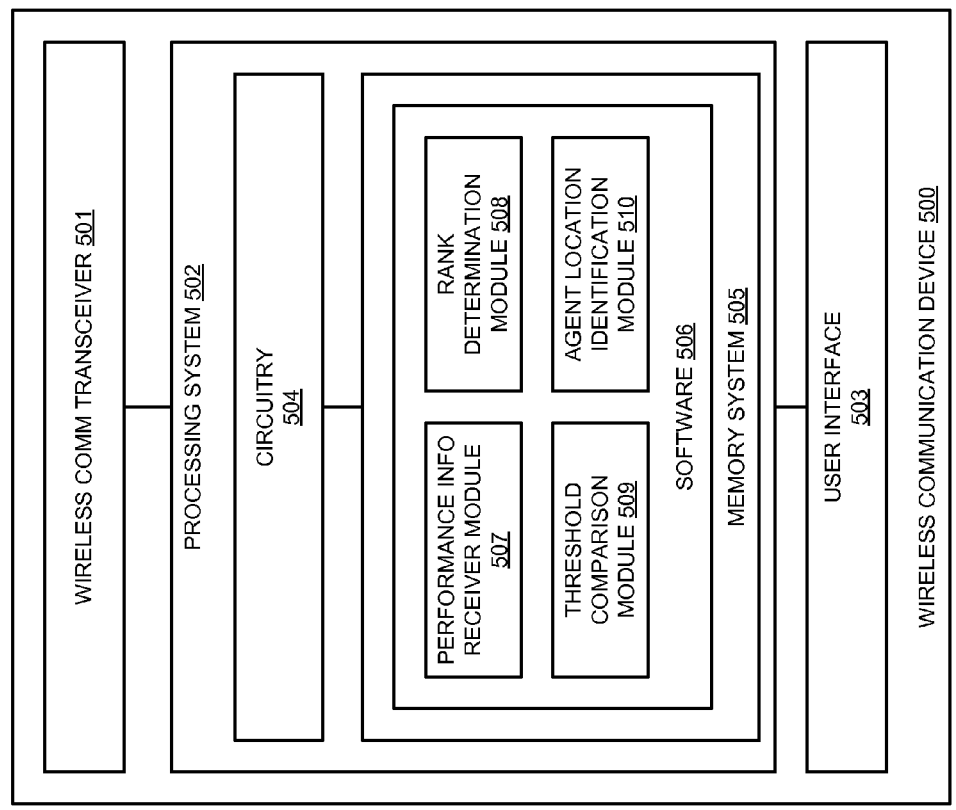

ENHANCED MULTIPATH ENVIRONMENTS FOR MIMO WIRELESS NETWORKS

TECHNICAL BACKGROUND

Modern wireless communication protocols may use multiple-input and multiple-output (MIMO) transmission schemes when transferring communications to wireless communication devices. MIMO uses multiple antennas for each carrier in a wireless access node in order to improve communication transfer performance. The improvements in communication transfer performance may include increased wireless range and data throughput. Some examples of MIMO wireless protocols include Worldwide Interoperability for Microwave Access (WiMAX), Long Term Evolution (LTE), and the latest 802.11n wireless protocols (Wi-Fi).

A key factor in the proper implementation of a MIMO communication system is multipath, since MIMO requires a multipath-rich environment. Scattering and multipath enable de-correlation of the signals at the receiver, which is a necessity for MIMO to function properly. In contrast, line-of-sight environments result in signals that typically are still highly correlated and thus cannot be distinguished from one another, leading to an inability for the receiver to decode the two signals and thus an implementation failure of MIMO. This problem is particularly common within buildings, where there is generally a lack of strong scattering agents and it can therefore be difficult to achieve a good multipath environment for MIMO. Without higher degrees of scattering and multipath within buildings, the potential benefits of MIMO are negated and ultimately a lower data throughput is experienced by users of the MIMO communication system.

OVERVIEW

A method to improve multipath environments for multiple-input multiple-output (MIMO) wireless networks is disclosed. The method comprises receiving MIMO performance information for a plurality of locations of a premises. The method further comprises processing the MIMO performance information to determine individual ranks associated with each of the locations, wherein higher ones of the ranks indicate better MIMO performance. The method further comprises comparing each of the individual ranks to a threshold to determine a group of suboptimal locations of the plurality of locations that have ranks falling below the threshold. The method further comprises processing the suboptimal locations with an in-building geometry of the premises to identify at least one location to install a scattering agent.

A wireless communication device to improve multipath environments for multiple-input multiple-output (MIMO) wireless networks comprises a wireless communication transceiver and a processing system. The wireless communication transceiver is configured to receive MIMO performance information for a plurality of locations of a premises. The processing system is configured to process the MIMO performance information to determine individual ranks associated with each of the locations, wherein higher ones of the ranks indicate better MIMO performance, compare each of the individual ranks to a threshold to determine a group of suboptimal locations of the plurality of locations that have ranks falling below the threshold, and process the suboptimal locations with an in-building geometry of the premises to identify at least one location to install a scattering agent.

A computer apparatus to improve multipath environments for multiple-input multiple-output (MIMO) wireless networks comprises software instructions and at least one non-transitory computer-readable storage medium storing the software instructions. The software instructions are configured, when executed by a wireless communication device, to direct the wireless communication device to receive MIMO performance information for a plurality of locations of a premises. The software instructions are further configured to direct the wireless communication device to process the MIMO performance information to determine individual ranks associated with each of the locations, wherein higher ones of the ranks indicate better MIMO performance. The software instructions are further configured to direct the wireless communication device to compare each of the individual ranks to a threshold to determine a group of suboptimal locations of the plurality of locations that have ranks falling below the threshold, and process the suboptimal locations with an in-building geometry of the premises to identify at least one location to install a scattering agent.

BRIEF DESCRIPTION OF THE DRAWINGS

FIG. 4 is a block diagram that illustrates rank indexes for various locations within a building.

FIG. 5 is a block diagram that illustrates a wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
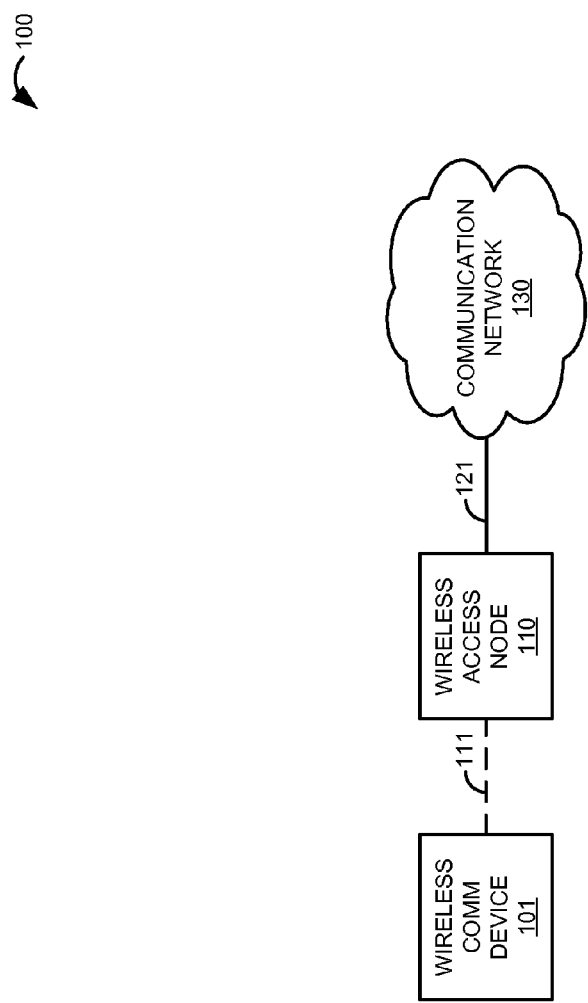
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121.

Figure 2:
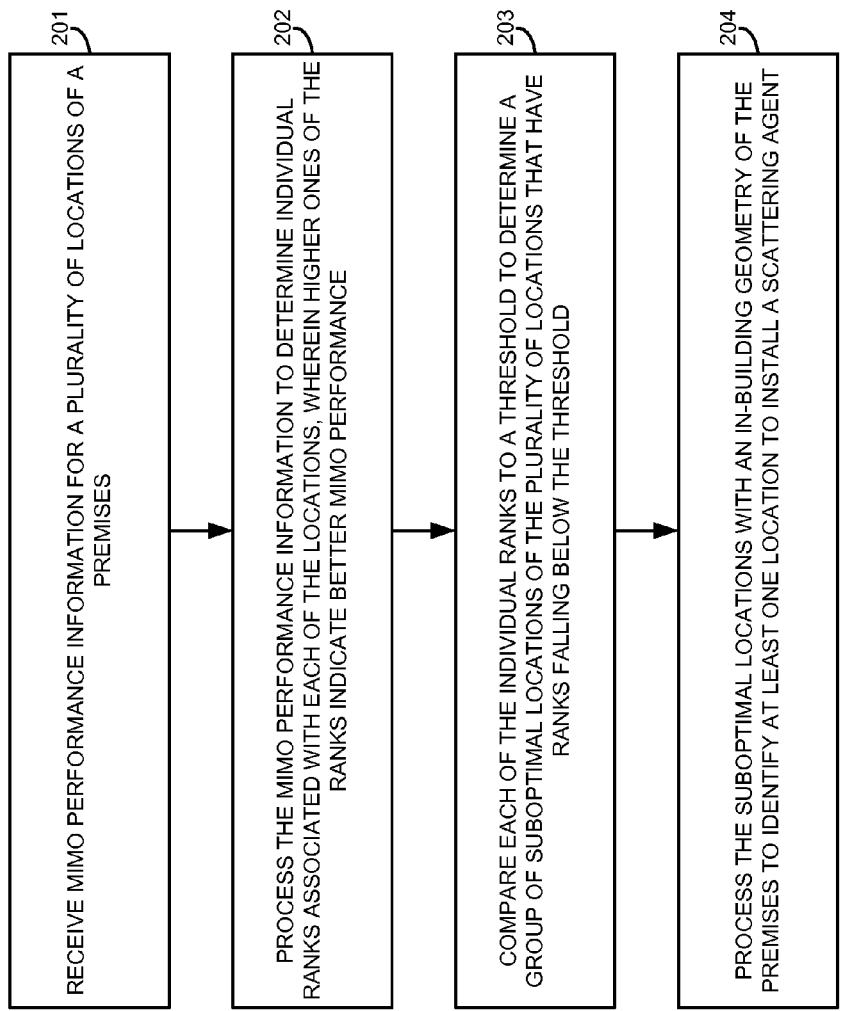
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed to improve multipath environments for multiple-input multiple-output (MIMO) wireless networks. The operation could be performed by wireless access node 110, wireless communication device 101, or some other data processing system of communication network 130, and the processing could be distributed among these and/or other network elements in some examples.

To begin, MIMO performance information for a plurality of locations of a premises is received (201). The premises typically includes at least one structure or building, although the premises could comprise any geographic area having definite boundary lines in some examples. The plurality of locations of the premises could comprise locations within the building, around the exterior of the building, or anywhere else on the premises. The MIMO performance information could indicate a level of efficacy for the transmission and/or reception of a MIMO signal at the various locations of the premises, such as am amount of data throughput for the MIMO signal. In some examples, the MIMO performance information could be received by scanning the plurality of locations of the premises to determine the MIMO performance information. For example, wireless communication device 101 could utilize a wireless communication transceiver to scan and detect various levels of MIMO performance at each of the plurality of locations of the premises. Different degrees of scattering and/or different degrees of multipath may also be received in the MIMO performance information for each of the plurality of locations of the premises. Other examples of MIMO performance information are possible and within the scope of this disclosure.

The MIMO performance information is then processed to determine individual ranks associated with each of the locations (202). In this example, higher ones of the ranks indicate better MIMO performance (202). The individual ranks are typically numerical values on a predetermined scale that factor in the MIMO performance information to generate a score or rank index for each of the locations of the premises. For example, the scale for the ranks could be from one to ten, where the location exhibiting the best MIMO performance might be ranked close to a ten and the location exhibiting the worst MIMO performance could be ranked a one. Of course, there are other ways to apply numerical ranks as a function of location, and any other scale could be used to rank the locations of the premises in other examples. In some examples, processing the MIMO performance information to determine the individual ranks associated with each of the locations could comprise determining a rank index per room of the plurality of locations of the premises. For example, each room of a building could be considered a separate location of the plurality of locations of the premises, and individual ranks could be applied to each room based on the MIMO performance information associated with each room location.

Each of the individual ranks associated with each of the locations is compared to a threshold to determine a group of suboptimal locations of the plurality of locations that have ranks falling below the threshold (203). The threshold is typically a predetermined value falling somewhere on the scale of the individual ranks associated with each of the locations. For example, on the scale of one to ten described above for the individual ranks, the threshold could be set to five, and any location having a rank that falls below the threshold of five would be included in the group of suboptimal locations. Other techniques of identifying the group of suboptimal locations based on the individual ranks for each of the locations are possible and within the scope of this disclosure.

The suboptimal locations are then processed with an in-building geometry of the premises to identify at least one location to install a scattering agent (204). The in-building geometry of the premises typically identifies the placement of rooms, walls, ceilings, doors, windows, and other physical attributes of a building on the premises. A scattering agent may be employed to achieve a higher degree of scattering and multipath to improve overall MIMO performance in the building. Some examples of a scattering agent could include a radio frequency (RF) reflector or any RF reflective material.

The location identified to install the scattering agent is typically selected based on where the scattering agent will provide the most improvement to MIMO performance by achieving higher degrees of scattering and multipath where these are most lacking in the building. In some examples, the location to install the scattering agent could comprise walls, ceilings, pillars, floors, cubicle walls, shelves, filing cabinets, desks, lockers, and any other location where a scattering agent could be installed, including combinations thereof. After identifying the location to install the scattering agent, a user could receive a suggestion to install the scattering agent at the at least one location identified in some examples.

Advantageously, the operation of FIG. 2 identifies at least one location to install a scattering agent so that scattering and multipath are improved for better MIMO performance. By identifying the areas with suboptimal MIMO performance and considering the in-building geometry of the premises, the locations where scattering agents will provide the most benefit are identified. In this manner, the multipath environment can be improved within the building, resulting in better MIMO performance with higher data throughput.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus— including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others— including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
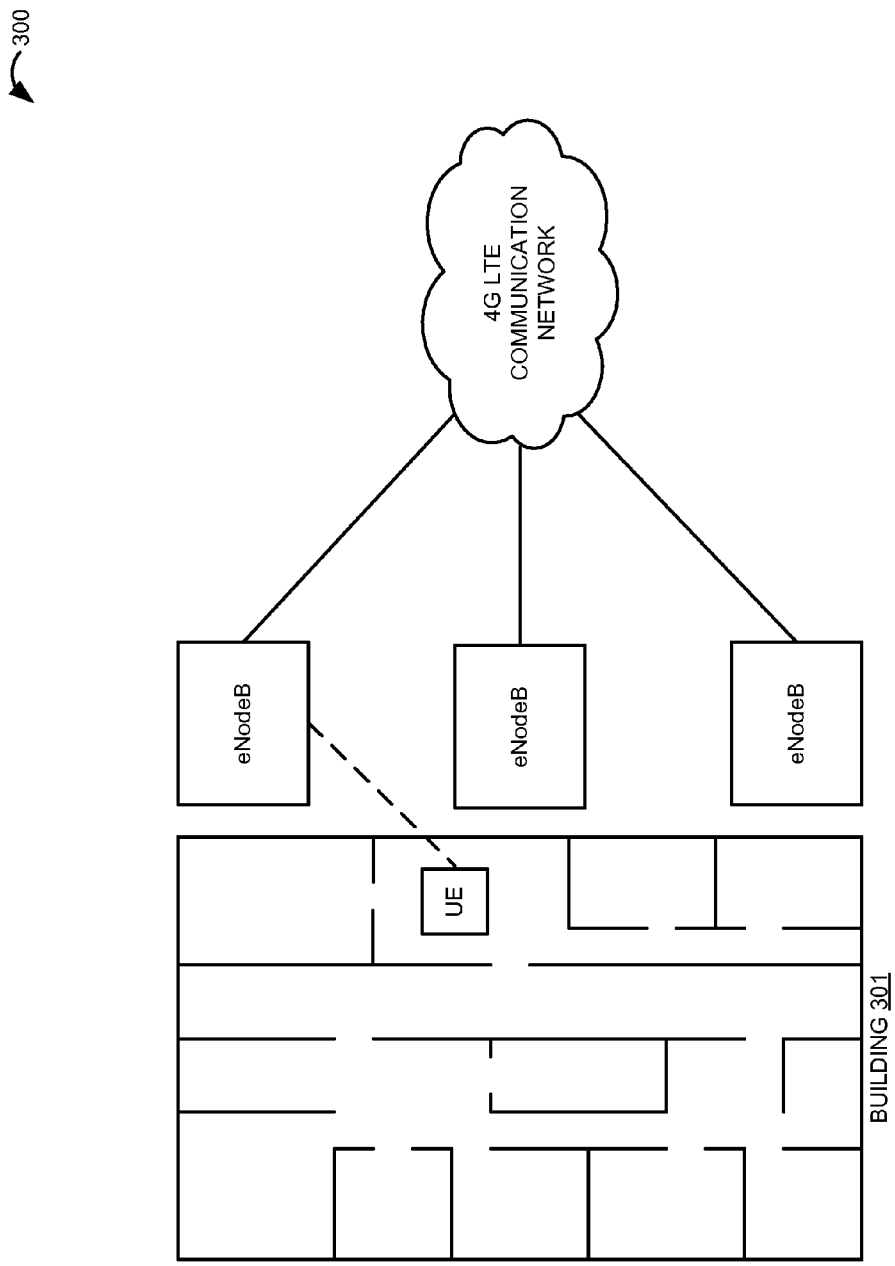
FIG. 3 is a block diagram that illustrates a communication system in an exemplary embodiment.

FIG. 3 is a block diagram that illustrates communication system 300 in an exemplary embodiment. In this example, three eNodeB base stations connected to a 4G LTE communication network are shown in the proximity of building 301. User equipment (UE) device is shown within building 301 and is presently in communication with one of the eNodeB base stations of the 4G LTE communication network. Building 301 has a number of rooms, hallways, and other divisions of the interior space which may affect the multipath environment and MIMO performance. In this example, a user operates the UE device as a test handset to scan building 301 for MIMO performance. Based on the MIMO performance test results, the UE device traces the rank index as a function of location for each room in building 301. The rank index for each room helps identify "MIMO holes" in the building, or those rooms or areas having lower rank indexes where MIMO performance is poor. The rank index for each room in building 301 as determine by scanning the building with the UE device is shown in FIG. 4.

FIG. 4 is a block diagram that illustrates rank indexes for various locations within building 301. In particular, each room is assigned a rank index on a scale of one to ten, with higher ranks indicating higher degrees of scattering and multipath that contribute to improved MIMO performance. The ranks are assigned by a user operating a UE device as a scan tool to gauge the degree of scattering and multipath that is present in each room that is derived from the MIMO performance observed at each location.

In this example, the rooms having the lowest rank indexes are identified as "MIMO holes" that exhibit poor multipath and scattering for MIMO transmissions. In particular, two adjacent rooms have respective rank indexes of two and four, both of which are across the hall from a room having a rank index of three. Therefore, this area, identified by the star icon shown on FIG. 4, is exhibiting particularly low MIMO performance and would benefit from additional scattering. With knowledge of the in-building geometry of building 301, the UE device determines that a scattering agent should be installed at the location identified by the star icon appearing in FIG. 4. Installing a scattering agent at this identified location will improve MIMO performance in the targeted area and will also improve overall MIMO performance throughout building 301.

In some examples, the UE device could not only indicate to the user the general area where installation of a scattering agent is recommended but also specific locations for the installation. For example, to create additional lateral scattering paths, the UE device could recommend mounting a scattering agent on walls and pillars. In another example, to create additional vertical scattering paths, the UE device could recommend mounting a scattering device on ceilings and floors. In yet another example, the UE device could suggest lining the tops of items such as cubicle walls, lockers, filing cabinets, and the like with scattering agents, and the geometry could be varied so as to create location-specific and/or frequency-specific multipath. In some examples, an antenna could be lined with an RF reflective material to improve scattering, and the geometry could again be varied so as to capitalize on the element spacing within the antenna.

By identifying locations within a building where additional scattering is necessary for improved MIMO performance, the UE device assists the user in creating a multipath environment that achieves the full benefits afforded by a MIMO wireless communication system. In addition, the UE device may suggest optimal locations where a scattering agent may be installed so as to create a multipath environment suitable for MIMO communications throughout building 301. In this manner, data throughput may be increased for all users of the MIMO communication system within building 301, resulting in a better user experience.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-510. Wireless communication device 500 may include other wellknown components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 501 may be configured to receive MIMO performance information for a plurality of locations of a premises.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-510, although software 506 could have alternative configurations in other examples.

When executed by processing circuitry 504, operating software 506 directs processing system 502 to operate wireless communication device 500 as described herein for wireless communication device 101. In particular, operating software 506 directs processing system 502 to receive MIMO performance information for a plurality of locations of a premises. Further, operating software 506 directs processing system 502 to process the MIMO performance information to determine individual ranks associated with each of the locations, wherein higher ones of the ranks indicate better MIMO performance. In addition, operating software 506 directs processing system 502 to compare each of the individual ranks to a threshold to determine a group of suboptimal locations of the plurality of locations that have ranks falling below the threshold. Finally, operating software 506 directs processing system 502 to process the suboptimal locations with an in-building geometry of the premises to identify at least one location to install a scattering agent.

In this example, operating software 506 comprises a performance information receiver software module 507 that receives MIMO performance information for a plurality of locations of a premises. Additionally, operating software 506 comprises a rank determination software module 508 that processes the MIMO performance information to determine individual ranks associated with each of the locations, wherein higher ones of the ranks indicate better MIMO performance. Operating software 506 also comprises a threshold comparison software module 509 that compares each of the individual ranks to a threshold to determine a group of suboptimal locations of the plurality of locations that have ranks falling below the threshold. Finally, operating software 506 comprises an agent location identification software module 510 that processes the suboptimal locations with an in-building geometry of the premises to identify at least one location to install a scattering agent.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to improve multipath environments for multiple-input multiple-output (MIMO) wireless networks, the method comprising:
   receiving MIMO performance information for a plurality of locations of a premises;
   processing the MIMO performance information to determine individual ranks associated with each of the locations, wherein higher ones of the ranks indicate better MIMO performance;
   comparing each of the individual ranks to a threshold to determine a group of suboptimal locations of the plurality of locations that have ranks falling below the threshold; and
   processing the suboptimal locations with an in-building geometry of the premises to identify at least one location to install a scattering agent.

2. The method of claim 1 wherein receiving the MIMO performance information comprises scanning the plurality of locations of the premises to determine the MIMO performance information.

3. The method of claim 1 wherein processing the MIMO performance information to determine the individual ranks associated with each of the locations comprises determining a rank index per room of the plurality of locations of the premises.

4. The method of claim 1 wherein receiving the MIMO performance information comprises receiving values representing different degrees of scattering for each of the plurality of locations of the premises.

5. The method of claim 1 wherein receiving the MIMO performance information comprises receiving values representing different levels of multipath for each of the plurality of locations of the premises.

6. The method of claim 1 further comprising suggesting to install the scattering agent at the at least one location identified.

7. The method of claim 1 wherein the at least one location to install the scattering agent comprises a cubicle wall.

8. A wireless communication device to improve multipath environments for multiple-input multiple-output (MIMO) wireless networks, the device comprising:
- a wireless communication transceiver configured to receive MIMO performance information for a plurality of locations of a premises; and
- a processing system configured to process the MIMO performance information to determine individual ranks associated with each of the locations, wherein higher ones of the ranks indicate better MIMO performance, compare each of the individual ranks to a threshold to determine a group of suboptimal locations of the plurality of locations that have ranks falling below the threshold, and process the suboptimal locations with an in-building geometry of the premises to identify at least one location to install a scattering agent.

9. The wireless communication device of claim 8 wherein the wireless communication transceiver configured to receive the MIMO performance information comprises the wireless communication transceiver configured to scan the plurality of locations of the premises to determine the MIMO performance information.

10. The wireless communication device of claim 8 wherein the processing system configured to process the MIMO performance information to determine the individual ranks associated with each of the locations comprises the processing system configured to determine a rank index per room of the plurality of locations of the premises.

11. The wireless communication device of claim 8 wherein the wireless communication transceiver configured to receive the MIMO performance information comprises the wireless communication transceiver configured to receive values representing different degrees of scattering for each of the plurality of locations of the premises.

12. The wireless communication device of claim 8 wherein the wireless communication transceiver configured to receive the MIMO performance information comprises the wireless communication transceiver configured to receive values representing different levels of multipath for each of the plurality of locations of the premises.

13. The wireless communication device of claim 8 further comprising the processing system configured to suggest to install the scattering agent at the at least one location identified.

14. The wireless communication device of claim 8 wherein the at least one location to install the scattering agent comprises a cubicle wall.

15. A computer apparatus to improve multipath environments for multiple-input multiple-output (MIMO) wireless networks, the apparatus comprising:
- software instructions configured, when executed by a wireless communication device, to direct the wireless communication device to receive MIMO performance information for a plurality of locations of a premises, process the MIMO performance information to determine individual ranks associated with each of the locations, wherein higher ones of the ranks indicate better MIMO performance, compare each of the individual ranks to a threshold to determine a group of suboptimal locations of the plurality of locations that have ranks falling below the threshold, and process the suboptimal locations with an in-building geometry of the premises to identify at least one location to install a scattering agent; and
- at least one non-transitory computer-readable storage medium storing the software instructions.

16. The computer apparatus of claim 15 wherein the software instructions configured to direct the wireless communication device to receive the MIMO performance information comprises the software instructions configured to direct the wireless communication device to scan the plurality of locations of the premises to determine the MIMO performance information.

17. The computer apparatus of claim 15 wherein the software instructions configured to direct the wireless communication device to process the MIMO performance information to determine the individual ranks associated with each of the locations comprises the software instructions configured to direct the wireless communication device to determine a rank index per room of the plurality of locations of the premises.

18. The computer apparatus of claim 15 wherein the software instructions configured to direct the wireless communication device to receive the MIMO performance information comprises the software instructions configured to direct the wireless communication device to receive values representing different degrees of scattering for each of the plurality of locations of the premises.

19. The computer apparatus of claim 15 wherein the software instructions configured to direct the wireless communication device to receive the MIMO performance information comprises the software instructions configured to direct the wireless communication device to receive values representing different levels of multipath for each of the plurality of locations of the premises.

20. The computer apparatus of claim 15 further comprising the software instructions configured to direct the wireless communication device to suggest to install the scattering agent at the at least one location identified.

* * * * *